United States Patent Office 2,740,723
Patented Apr. 3, 1956

2,740,723

PREPARATION OF FINELY DIVIDED CELLULOSE PLASTICS

Robert S. Voris, Arden, Del., assignor to Hercules Powder Company, Wilmington, Del., a corporation of Delaware No Drawing. Application May 8, 1951,
Serial No. 225,271

6 Claims. (Cl. 106—196)

This invention relates to the preparation of film-forming plastics. In one of its aspects this invention relates to the preparation of finely-divided cellulosic plastics.

The preparation of plastic coating compositions is normally accomplished by dissolving the plastic and modifiers in a suitable solvent, and films and coatings then are formed by evaporation of the solvent from a thin layer of the resulting composition. Serious economic limitations on this method are the solubility characteristics of the plastic in the solvent, the relatively high viscosity of the solutions, and the cost of solvent, whether lost or recovered. An alternate method, emulsification, still requires a solvent for the plastic.

In recent years a new method of applying coatings of vinyl resin compositions has met with wide acceptance, first in Germany and Great Britain, and more recently in the United States. This procedure involves dispersion of the plastic, in finely-divided form, with or without plasticizer in a nonsolvent medium, and coatings of such dispersions laid down on various substrata are coalesced to continuous films by application of heat and/or pressure. The disadvantages of solvent application as listed above are thus eliminated. This method of applying plastic coatings has been limited to vinyl resin compositions since the vinyl plastics by virtue of their preparation by emulsion polymerization are easily recovered in the finely-divided state at little added expense. No examples are known of the use of finely-divided cellulosic plastics in this manner because such plastics are not so easily produced in a finely-divided state as are vinyl plastics. In fact, no satisfactory means of preparing cellulosic plastics in the same state of subdivision has been developed.

Two processes have been tried for the preparation of cellulosic plastics in a finely-divided form. They are mechanical grinding and spray drying of a solution of the plastic. Mechanical grinding is entirely inadequate for obtaining a particle size suitable for use in film formation since it results in a powder of relatively large average particle size and irregularly shaped particles. Such a powder does not produce a homogeneous film, and the powder is characterized by a low bulk density which also makes efficient film formation difficult.

Spray drying a solution of the plastic produces better results than mechanical grinding, but it has also proved to be inadequate. The average particle size obtained by such a process is from 15 to 30 microns, with maximum sizes ranging from 65 to 180 microns in diameter. Microscopic examination of the product revealed that the solution-sprayed cellulosics are irregularly shaped, consisting of solid particles, hollow spheres, and fine threads. The bulk density is rather low, ranging from 0.06 to 0.14 g./ml. An additional drawback to this method is the relatively large amount of solvent required in the solution and to be recovered per pound of product.

It is an object of this invention to provide a novel process for preparing film-forming plastics in a finely-divided form and having properties superior to the prior art preparations.

It is another object of this invention to provide a novel process for preparing cellulosic plastics suitable for use in coating compositions heretofore not available in the prior art.

It is a further object of this invention to provide novel coating compositions containing the finely-divided cellulosic plastics.

Further and additional objects of this invention will be apparent from the detailed disclosure that follows.

In accordance with the present invention, it is possible to prepare film-forming plastics in finely-divided form having vastly improved shape, size, and bulk density characteristics and to employ the resulting finely-divided material in novel composition coatings.

The method of preparing the finely-divided film-forming plastic is briefly as follows: The plastic is dispersed in a lacquer-in-water emulsion containing, in addition to the plastic and water, an emulsifying agent and a low boiling water-immiscible solvent for the plastic that can be emulsified without precipitation of the dispersed plastic. The resulting emulsion is then sprayed in fine droplet or mist form into a heated gaseous medium that acts as a desiccating vehicle. The resulting dried plastic is then readily recoverable in the form of fine particles or a powder.

Very finely-divided particles having an average diameter of less than 15 microns and on the order of 5 to 10 microns have been prepared successfully by this method. Plastic particles so prepared have a bulk density of 0.3 to 0.45 g./ml. and are a mixture of hollow and solid spheroids. Such finely-divided materials offer a number of opportunities for expanding the use of cellulose derivatives into new applications, and offer advantages in other fields of application over existing forms of flake and granular cellulose derivatives.

The advantages for the finely-divided plastics of this invention are directly related to the extremely small particle size and to the configuration and texture imparted to the particles by the spray-drying method of preparation. An attractive feature is that preformulated compositions containing plasticizing agents and pigments can be prepared in this way in extremely small particles, homogeneous in composition and free of solvent, which can then be fabricated by new methods. New methods for which these particles are particularly adapted are organosols, hydrosols, plastisols, and flame spraying.

The following examples will serve to illustrate the invention.

Example 1

To a solution of 20 lb. ethyl cellulose, having an ethoxy content of 47.5 to 49% and a viscosity of 18 to 24 cps., in 72 lb. methylene chloride and 8 lb. ethanol (95%) was added 50 lb. water and 0.25 lb. sodium dioctyl sulfosuccinate. This mix was colloided by one pass through a colloid mill at 1-mil setting. The emulsion was spray dried in air at a blow case pressure of 75 p. s. i., an atomizer pressure of 60 p. s. i., an air inlet temperature of 380° to 400° F. and an air outlet temperature of 175° to 190° F.

The resulting particles averaged 10 microns in size with a maximum diameter of 80 microns. The particles consisted of solid and hollow spheroids and had a bulk density of 0.35 g./ml.

Example 2

To a solution of 5.2 lb. ethyl cellulose, having an ethoxy content of 47.5 to 49% and a viscosity of 40 to 52 cps., 0.8 lb. dibutyl phthalate, and 0.50 lb. octylphenol in 18.6 lb. methylene chloride and 2.1 lb. butanol was added 13.1 lb. water and 0.02 lb. sodium lauryl sulfate. This mix was colloided by one pass through a colloid mill at 1-mil setting. The emulsion was spray dried in air at a blow case pressure of 75 p. s. i., an atomizer pressure of 55 p. s. i., an air inlet temperature of 330° to 355° F. and an air outlet temperature of 180° to 210° F.

The resulting particles averaged 5 microns in diameter with a maximum diameter of 15 microns. The particles consisted of solid and hollow spheroids and had a bulk density of 0.45 g./ml.

*Example 3*

An emulsion containing 3.18 kg. of cellulose acetate, containing 55.5 to 56.2% combined acetic acid and having a viscosity of 35 to 55 seconds, 0.80 kg. methyl phthalyl ethyl glycolate, 23.8 kg. methylene chloride, 2.6 kg. ethanol (95%), 0.08 kg. sodium dioctyl sulfosuccinate and 12.2 kg. water was spray dried at a blow case pressure of 65 p. s. i., an atomizer pressure of 40 p. s. i., an air inlet temperature of 345° to 360° F. and an air outlet temperature of 170° to 200° F.

The product was a fine powder whose particles consisted of solid and hollow spheroids with an average diameter of 5 microns, a maximum diameter of 15 microns, and a bulk density of 0.45 g./ml.

*Example 4*

An emulsion containing 30 lb. cellulose acetate, as in Example 3, 216 lb. methylene chloride, 54 lb. ethanol (95%), 150 lb. water, and 0.375 lb. sodium dioctyl sulfosuccinate was spray dried in air at a blow case pressure of 80 p. s. i., an atomizer pressure of 60 p. s. i., an air inlet temperature of 380 to 405° F. and an air outlet temperature of 180° to 200° F.

The particles consisted of solid and hollow spheroids with an average diameter of 5 microns, a maximum diameter of 10 microns, and a bulk density of 0.40 g./ml.

In carrying out the preceding examples, the spray drying was accomplished by forcing the emulsion from a blow case through a two-fluid atomizing nozzle into a drying chamber concurrent with a stream of hot air. In place of the hot air other hot, gaseous, inert media can be used to dry the emulsion. For example, a stream of hot flue gases can be employed or a manufactured domestic gas can be burned in a furnace after which the products are led to the drier, and the temperature of the gases entering the drier can be controlled by the addition of fresh air or recycled gas. The drying gas should be relatively free of carbon to prevent contamination of the product particles. The gases entering the drier should be at a temperature such that the desired drying is effected but below the temperature at which fusion of the product particles occurs. Usually the inlet temperature of the gas is within the range of 300° to 500° F., and the outlet temperature is within the range of 175° to 225° F., but temperatures outside these ranges can be used, if desired. After passage through the drier, the gas and entrained product particles are blown into a cyclone collection system for recovery of the product particles. The invention with which this application is concerned, however, is not limited to carrying out the spray drying in any particular manner and any of the processes for spray drying known to the art can be employed. Similarly, the emulsification of the plastic is not restricted to the use of a colloid mill. For example, the emulsification can be effected by a homogenizer, by supersonic means or by simple agitation of the mixture by stirring. Any available type of emulsifying agent can be used, and the specific examples are merely illustrative of the emulsifying agents that are effective in this process.

The solvent that is employed in the emulsion is substantially water-immiscible. In the specific examples a combination of water-miscible and water-immiscible solvents were used, but the ratio of solvents was such that the resulting solvent formed by them was substantially water-immiscible. The use of such a combination of solvents is not essential, and, if desired, a water-immiscible solvent can be used without the addition of a water-miscible solvent. When using a combination of solvents, it is preferable that the water-immiscible solvent be lower boiling than the water-miscible solvent so that the cellulosic plastic is precipitated into a lean solvent mixture. In addition to the water-miscible and water-immiscible solvents set out in the examples, other solvents can be used. For example, methyl acetate, ethyl acetate, acetone, and the like, are water-soluble solvents that can be used alone or in combination with other solvents, such as ethyl chloride, ethylene dichloride, appropriate hydrocarbons, and the like. With an ethyl cellulose or cellulose acetate formulation it is preferred to employ a solvent containing from 80 to 95 parts by weight of methylene chloride and from 20 to 5 parts by weight of a lower aliphatic alcohol such as methanol, ethanol, propanol and butanol.

In preparing the premix before colloiding, several schemes are operable: (1) add water and emulsifier to the lacquer phase, (2) add water to the lacquer phase containing emulsifier, (3) add solvent to a mixture of water, plastic and emulsifier, or (4) add plastic to an emulsion of solvent and water. Method (2) has been used in the examples, but the process is not restricted to this method. Any of the other methods outlined are operable.

The process of the invention is generally applicable to cellulosic plastic compositions. Among the applicable cellulosics are single esters, such as cellulose acetate, cellulose propionate, cellulose butyrate, cellulose benzoate, cellulose stearate and cellulose crotonate, and the like; mixed esters, such as cellulose acetate propionate, cellulose acetate butyrate, cellulose acetate benzoate, cellulose acetate phthalate, cellulose acetate crotonate, and the like; ethers such as ethyl cellulose, benzyl cellulose, and the like; and mixed ester-ethers, such as ethyl hydroxyethyl cellulose, hydroxyethyl cellulose acetate, ethyl cellulose acetate, ethyl cellulose crotonate, benzyl cellulose acetate, and the like.

It will be apparent that powdered plastics as described in the foregoing examples may include pigments, plasticizers and other modifiers which are conventionally employed in such materials. Example 2 shows the use of a plasticized ethyl cellulose composition.

The products of this process are particularly useful in the application of plasticized cellulosic plastic coatings without recourse to the expense or hazards associated with the use of solvents. This may be accomplished by utilizing the finely-divided plastics, produced as shown, as dispersions in water (hydrosols) with or without suitable plasticizers, as dispersions in nonsolvent organic media (organosols) with or without suitable plasticizers, and as dispersions in certain selected plasticizers (plastisols).

The preparation of organosols and hydrosols with cellulosic plastics has been known to the art, though no commercial exploitation of these methods is known, probably due to the deficiencies of the powders available in the prior art. A drawback in the prior art in the use of plasticized cellulosic sols was that the plasticizer, when employing the prior art powders, had to be soluble in the dispersing medium or else added in sufficient amounts to cause gelation of the entire sol. With the powders of this invention, however, it is both possible and practical to disperse the finely-divided plastic in a nonsolvent for the plasticizer without obtaining a gel. The elimination of the necessity for a solvent for the plasticizer eliminates the cost and risk inherent in its use. By obtaining practical and permanent plasticized dispersions without the necessity of forming gels, greater flexibility in permissible film compositions and in means of applying the compositions is now possible.

Only simple stirring is required to disperse the plasticizer in the finely-divided plastic. It is advantageous to form first a slurry of the finely-divided plastic in the dispersion medium and then stir in plasticizers and other modifiers. If the dispersion medium is added to a paste of the cellulose and plasticizer, agglomerates often result. Pebble-milling the dispersion results in lowered viscosity, some reduction in particle size and an improved homogeneity of the fused film, but it is not required. Films cast from these dispersions are continuous, flexible, and have excellent gloss.

The following examples are illustrative of the use of the finely-divided plastics prepared as already described (all figures are in parts by weight):

Hydrosols

| | |
|---|---|
| Ethyl cellulose, spray-dried | 75 |
| Mixed octyldecylphthalate | 25 |
| Octylphenol | 2.25 |
| Distilled water | 100 |

To spray-dried ethyl cellulose, add distilled water with mixing and mix in mixed octyldecylphthalate and octylphenol. Place the mixture in a 1-quart pebble mill and grind overnight and cast 3-mil (wet) films on clay-coated paper stock. Allow water to be absorbed into the paper (10 to 20 seconds). Then fuse by heating for 30 seconds in a forced-draft oven at 200° C. The fused films are continuous, flexible, and have excellent gloss.

Organosols

| | |
|---|---|
| Cellulose acetate, spray-dried | 60 |
| Methyl phthalyl ethyl glycolate | 40 |
| Diacetone | 15 |
| Petroleum distillate containing dehydrogenated naphthenes and cyclicized hydrocarbons | 85 |

Mix diacetone and petroleum distillate and add the mixture to cellulose acetate with stirring. Add plasticizer and place the resulting dispersion in a pebble mill and grind overnight. Apply 8-mil (wet) films of this dispersion to an 0.07-inch thick polished stainless steel panel. Fuse 1½ to 5 minutes in a forced-draft oven at 235° C. (Fusion time is dependent on rate of heat transfer through the panel.) Resultant films are clear, slightly granular, continuous, and have good strength and flexibility.

The above examples are merely illustrative of plasticizers and dispersing media that can be used in film formation with the finely-divided plastics of this invention. In a similar manner plastisols can be formed with the finely-divided plastics of this invention by mixing the plastic with a plasticizer which is a nonsolvent for the plastic at room temperature but which is a solvent for the plastic at elevated temperatures. For example, a plastisol can be prepared by dissolving chlorinated diphenyl in mineral oil after which the plasticizer is mixed with finely-divided, spray-dried ethyl cellulose. The resulting thick paste is applied to a tin plate and fused for 30 seconds at 180° C. The resulting coating is a tough, plastic film.

Choice of plasticizers for these dispersions is quite critical. Stable dispersions cannot be prepared with plasticizers in which the plastics are quite soluble at room temperature. Also, the plastic must be soluble in the plasticizer at the temperature of fusing the film. The permissible range of plasticizer content for the dispersions is variable, but from the standpoint of film properties it is desirable for the dispersion to contain no more than 50% but not less than 10% plasticizer, based on total solids.

The hydrosols produced as described above are dilatant to varying degrees but this property can be eliminated by dilution of the dispersion. Dilution, however, increases the settling tendency of the suspended particles. It has been found that addition of 0.1 to 0.5% (based on total solids) of high viscosity methyl cellulose decreases both dilatancy and settling. In ethyl cellulose hydrosols this treatment eliminates both settling and dilatancy as deterrents to application of films. Cellulose acetate hydrosols which still exhibit some settling can be stabilized by the further addition of 0.05 to 0.1% (based on total solids) of sodium silicate. Such modified hydrosols appear to gel on storage, but no settling occurs, and only mild agitation is required to restore this gel-like dispersion to a free-flowing fluid.

Fusion of films, prepared as described above, can be accomplished in forced-draft ovens, by infrared lamps or heaters, and in the case of foil coatings, by conduction heating. Other means known to the art may be used. Coatings on porous substrata can be dried and fused in one heating operation. On nonporous substrata it is advisable to heat the films at a temperature below the fusion temperature to drive off water without fusion, and then this step is followed with the normal fusion cycle. This procedure lessens the chances of blistering of applied films.

In the case of hydrosols and organosols, the coatings can be applied by such commercial means as reverse roll or blade coaters or spray application.

The extremely fine particle size made posible by this invention improves the homogeneity of the fused films and renders the films more readily fusible. The novel and useful means of adding plasticizers to the film-coating composition is also attributable to the improved particle properties of the finely-divided plastics as the successful dispersion of plasticizers in the film-coating compositions seems to be due to absorption of plasticizer on the finely-divided plastic particles.

What I claim and desire to protect by Letters Patent is:

1. The process for preparing a dry finely-divided plastic composition which comprises emulsifying a lacquer in water to form a lacquer-in-water emulsion, said lacquer essentially consisting of cellulosic plastic dissolved in a substantially water-immiscible volatile solvent therefor, said cellulosic plastic being selected from the group consisting of cellulose esters and ethers containing only carbon, hydrogen and oxygen, and spraying the emulsion thus formed into a heated gaseous medium to vaporize liquid from said emulsion and produce a dry powder of said plastic, said powder being a mixture of solid and hollow spheroids having a bulk density of at least 0.3 gram per milliliter and an average particle diameter of less than 15 microns, and suitable for suspension in a liquid medium which is a nonsolvent for said cellulosic plastic to produce a suspension-type coating composition.

2. The process of preparing a dry finely-divided plastic composition which comprises emulsifying a lacquer in water to form a lacquer-in-water emulsion, said lacquer essentially consisting of cellulosic plastic dissolved in a substantially water-immiscible volatile solvent therefor comprising a lower alkyl chloride, said cellulosic plastic being selected from the group consisting of cellulose esters and ethers containing only carbon, hydrogen and oxygen, and spraying the emulsion thus formed into a heated gaseous medium to vaporize liquid from said emulsion and produce a dry powder of said plastic, said powder being a mixture of solid and hollow spheroids having a bulk density of at least 0.3 gram per milliliter and an average particle diameter of less than 15 microns and suitable for suspension in a liquid medium which is a nonsolvent for said cellulosic plastic to produce a suspension-type coating composition.

3. The process of preparing a dry finely-divided plastic composition which comprises emulsifying a lacquer in water to form a lacquer-in-water emulsion, said lacquer essentially consisting of cellulosic plastic dissolved in a substantially water-immiscible volatile solvent therefor comprising a lower alkyl chloride and a lower aliphatic alcohol, said cellulosic plastic being selected from the group consisting of cellulose esters and ethers containing only carbon, hydrogen and oxygen, and spraying the emulsion thus formed into a stream of hot air to vaporize liquid from said emulsion and produce a dry powder of said plastic, said powder being a mixture of solid and hollow spheroids having a bulk density of at least 0.3 gram per milliliter and an average particle diameter of less than 15 microns and suitable for suspension in a liquid medium which is a nonsolvent for said cellulosic plastic to produce a suspension-type coating composition.

4. A dry finely-divided powder of a cellulosic plastic selected from the group consisting of cellulose esters and ethers containing only carbon, hydrogen and oxygen, said powder being a mixture of solid and hollow spheroids having a bulk density of at least 0.3 gram per milliliter and an average particle diameter of less than 15 microns and suitable for suspension in a liquid medium which is a nonsolvent for said cellulosic plastic to produce a suspension-type coating composition, said powder being the product produced in accordance with claim 1.

5. A process according to claim 3 wherein the cellulosic plastic is cellulose acetate.

6. A process according to claim 3 wherein the cellulosic plastic is ethyl cellulose.

References Cited in the file of this patent

UNITED STATES PATENTS

| | | |
|---|---|---|
| 1,516,225 | Webb | Nov. 18, 1924 |
| 1,870,864 | Pratt et al. | Aug. 9, 1932 |
| 1,908,550 | Staud et al. | May 9, 1933 |
| 1,936,989 | Peters | Nov. 28, 1933 |
| 2,006,362 | Malm | July 2, 1935 |
| 2,272,152 | Moore | Feb. 3, 1942 |
| 2,460,546 | Stephanoff | Feb. 1, 1949 |